United States Patent
Billetz et al.

(10) Patent No.: US 9,753,303 B2
(45) Date of Patent: Sep. 5, 2017

(54) REMOVABLE EYEGLASS LENS AND FRAME PLATFORM

(71) Applicant: FRAMERI INC., Cincinnati, OH (US)

(72) Inventors: Konrad C. Billetz, Cincinnati, OH (US); Noel L. Gauthier, Cincinnati, OH (US)

(73) Assignee: FRAMERI INC., Cincinnati, OH (US)

( * ) Notice: Subject to any disclaimer, the term of this patent is extended or adjusted under 35 U.S.C. 154(b) by 0 days.

(21) Appl. No.: 14/914,783

(22) PCT Filed: Aug. 27, 2014

(86) PCT No.: PCT/US2014/052971
§ 371 (c)(1),
(2) Date: Feb. 26, 2016

(87) PCT Pub. No.: WO2015/031511
PCT Pub. Date: Mar. 5, 2015

(65) Prior Publication Data
US 2016/0202496 A1    Jul. 14, 2016

Related U.S. Application Data

(60) Provisional application No. 61/870,494, filed on Aug. 27, 2013.

(51) Int. Cl.
*G02C 1/06* (2006.01)
*G02C 1/00* (2006.01)
*G02C 13/00* (2006.01)

(52) U.S. Cl.
CPC ............... *G02C 1/10* (2013.01); *G02C 1/06* (2013.01); *G02C 13/001* (2013.01); *G02C 2200/08* (2013.01)

(58) Field of Classification Search
CPC ............... G02C 9/04; G02C 1/08; G02C 1/06
USPC ................... 351/86, 83, 96, 93, 106, 103
See application file for complete search history.

(56) References Cited

U.S. PATENT DOCUMENTS

| | | | |
|---|---|---|---|
| 3,060,803 A | 10/1962 | McCulloch | |
| 4,340,282 A * | 7/1982 | Murakami | G02C 1/10 351/154 |
| 4,921,341 A * | 5/1990 | Ace | G02C 1/10 351/154 |
| 4,971,431 A | 11/1990 | Gerard | |
| 5,288,533 A * | 2/1994 | Remick, II | G02C 1/06 351/154 |

(Continued)

OTHER PUBLICATIONS

PCT/US2014/052971 International Search Report and Written Opinion.

(Continued)

*Primary Examiner* — Hung Dang
(74) *Attorney, Agent, or Firm* — Fay Sharpe LLP

(57) ABSTRACT

An eyeglass assembly includes a frame having first and second lens openings. A lens is dimensioned for receipt in the lens opening. The lens has a key selectively interconnecting the lens to frame in a lens opening. The key has a protrusion received in a complementary groove in the frame around the lens opening, and a tab along a minor portion of the key that is received in a notch in the frame groove which provide a region where less force is required to mount or remove the lens relative to the frame.

18 Claims, 11 Drawing Sheets

(56) References Cited

U.S. PATENT DOCUMENTS

| | | | | |
|---|---|---|---|---|
| 5,400,089 | A | * | 3/1995 | Danloup .................. G02C 1/10 |
| | | | | 351/154 |
| 6,074,059 | A | | 6/2000 | Glass et al. |
| 6,964,477 | B1 | | 11/2005 | Teng |
| 7,543,930 | B2 | | 6/2009 | DiChiara |
| 2009/0296042 | A1 | | 12/2009 | Yeh |

OTHER PUBLICATIONS

EP 14 84 0910 Supplementary European Search Report, dated Mar. 9, 2017.

* cited by examiner

REMOVABLE EYEGLASS LENS AND FRAME PLATFORM

This application claims the priority benefit of U.S. application Ser. No. 61/870,494, filed Aug. 27, 2013, the entire disclosure of which is incorporated herein by reference.

BACKGROUND

The present disclosure is in the technical field of eyewear (prescription and non-prescription, regular glasses and sunglasses) with interchangeable lenses. Eyeglasses are well known in the art for correcting impaired vision. Lenses are typically secured to a frame via a screw or other semi-permanent connection. An eyeglass wearer wishing to remove lenses from the frame of his or her eyeglasses must disassemble the frame, which typically requires the use of an appropriate sized screwdriver or other tool. This makes lens removal burdensome and time-consuming for most eyeglass wearers.

Other removable lens configurations, such as snap-fit lenses that are typically inserted into the frame from the front side of the frame (i.e., that side of the frame furthest from the face) have no special structure or adaptation to facilitate mounting of the snap-fit lenses. Moreover, the snap-fit lenses, split rims, and frames with removable temple pieces may also be cumbersome to remove as they typically require a considerable amount of force to be applied to install and remove the lenses. This makes lens installation and removal particularly difficult for those with impaired fine motor skills. Applying the requisite force may also result in damage to the lenses or frame.

The varying dimensions of prescription lenses further complicate the development of an interchangeable eyeglass lens system. Typically, frames must be altered to secure lenses of varying dimensions, e.g., thicknesses. If an eyeglass wearer's prescription changes and thereby requiring a new lens of a different thickness, the frame used with the old prescription lenses may be incompatible with the new prescription lenses.

Thus a need exists for an improved, easy-to-use, interchangeable and/or removable eyeglass lens that overcomes these problems and others in a manner that is effective and inexpensive, while simultaneously providing desired style and aesthetical appeal.

BRIEF DESCRIPTION

The present disclosure is a removable eyeglass lens and frame platform. A key is affixed to the rim of each eyeglass lens and secures the lenses to the frame. The key fits into a groove along the lens rim, and also fits into a corresponding groove within the frame. The key includes a notch where the lens adjoins the bridge piece of the frame, and the frame is notched to complement the docked key and lens. The lenses may be inserted by pressing each lens into the lens openings of the frame. Lenses may be removed by pressing of the surface of the lens.

DETAILED DESCRIPTION

Figure 1:
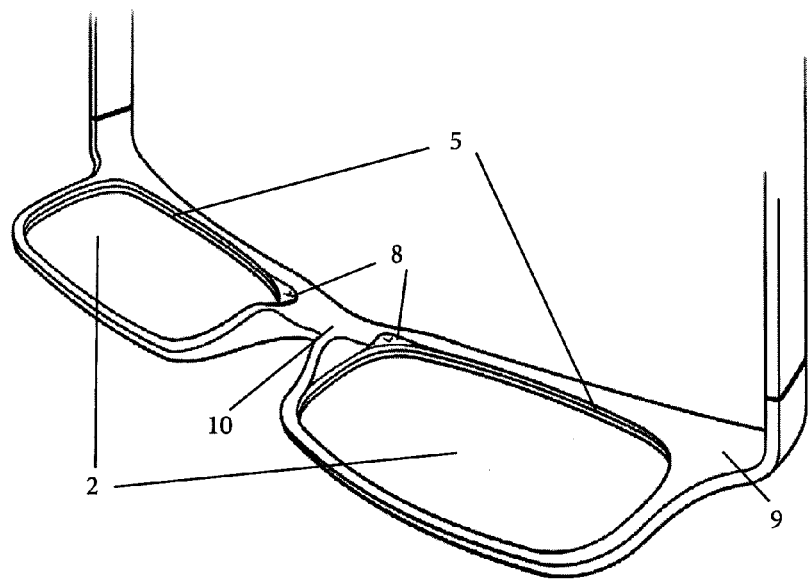
FIG. 1 is a perspective view of a frame with lenses docked, a key/ring/bumper affixed to the lens rim, with a tab thereof extending outwardly from a corner of the key.
Figure 2:
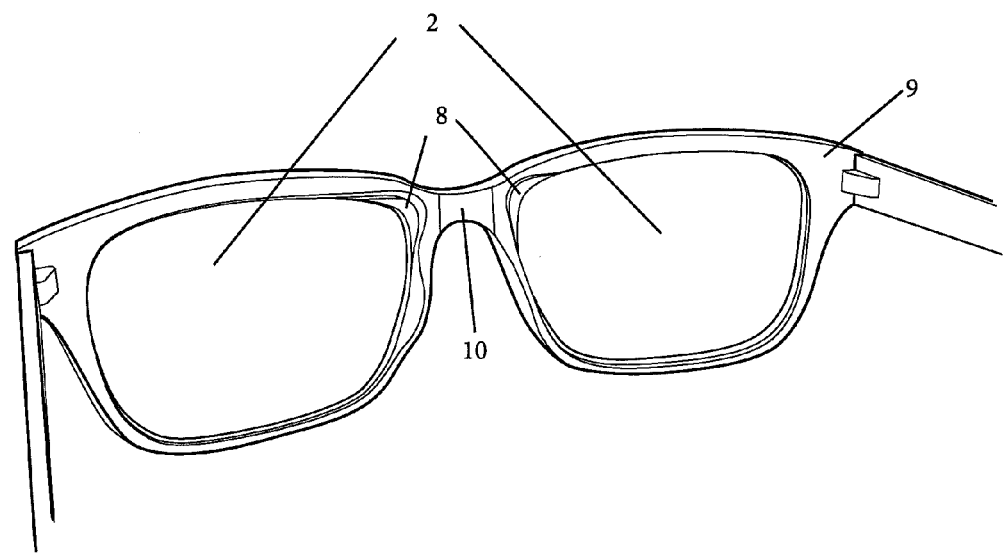
FIG. 2 is a perspective view of a frame with lenses docked and tabs visibly extending from the key.
Figure 3:
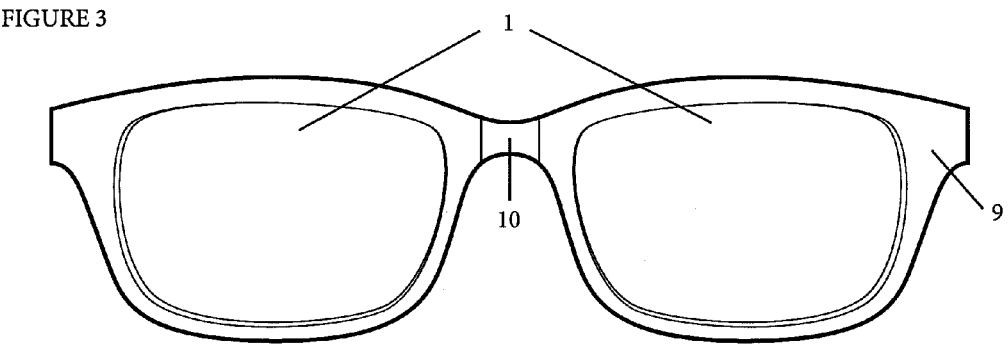
FIG. 3 shows the front side of the lenses docked in a frame.
Figure 4:
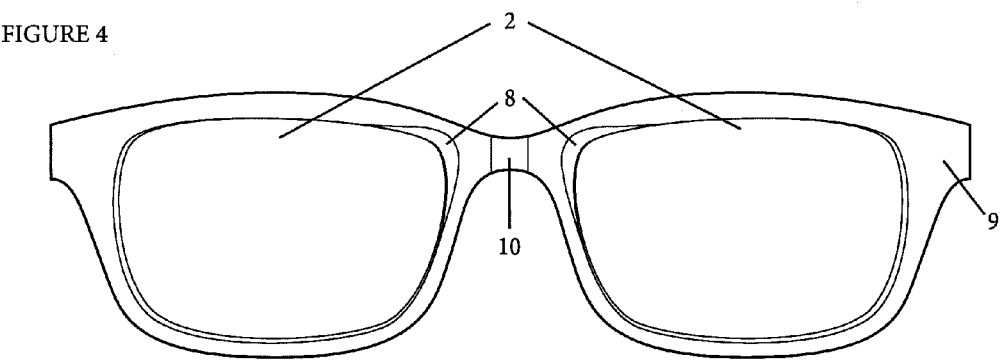
FIG. 4 shows the back sides of the lenses docked in a frame. The tab protruding from the key is also visible.
Figure 5:
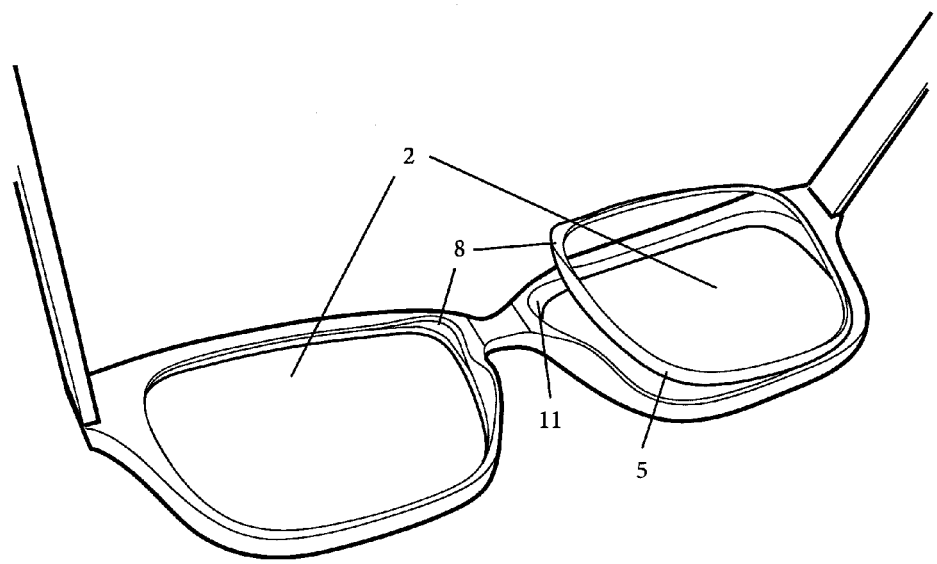
FIG. 5 is a perspective view showing the back side of the lenses docked in a frame, with one lens partially removed. The key attached to the lens rim is visible, as is the tab protruding from the key.
Figure 6:
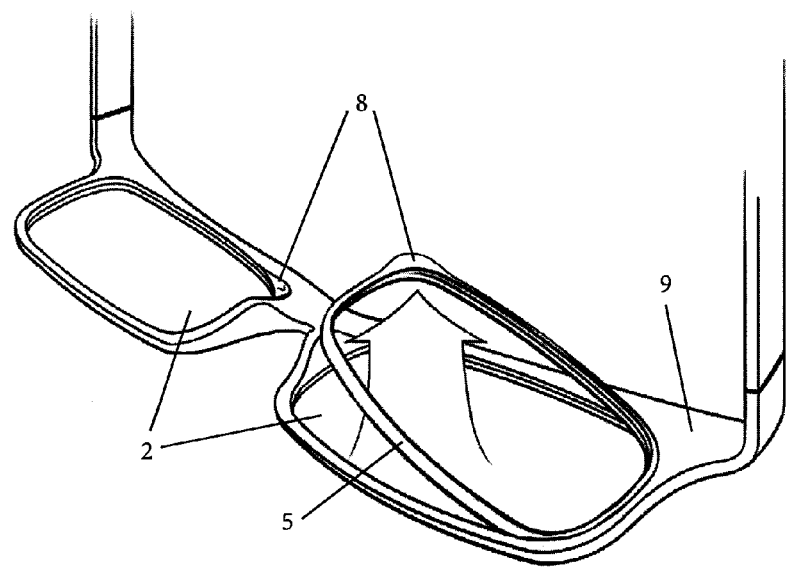
FIG. 6 is a perspective view showing the back side of the lenses docked in a frame, with one lens partially removed. The key to the lens rim is visible, as is the tab protruding from the key.
Figure 7:
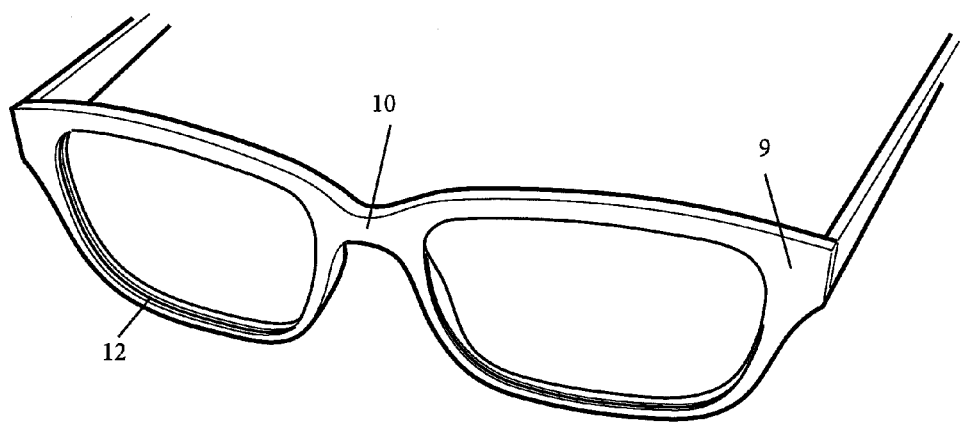
FIG. 7 is a perspective view of a frame with no lenses docked, and frame groove visible.
Figure 8:
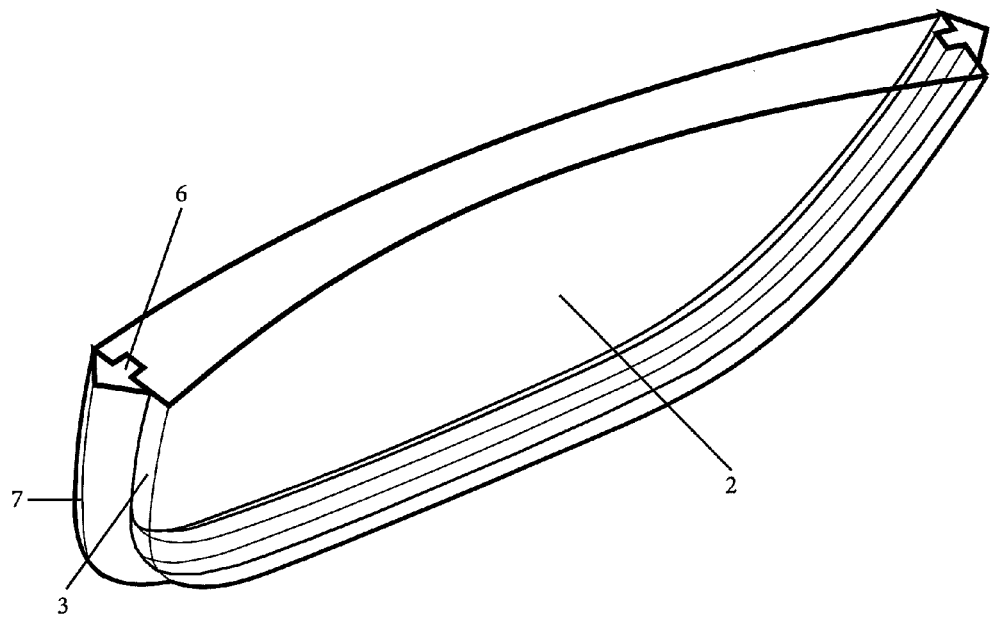
FIG. 8 is a cross-sectional, perspective view of a lens with key attached. The inner perimeter of the key and outer perimeter of the key are differentiated.

The disclosure relates to an eyewear system with easily removable lenses and an example apparatus which achieves this function. The subject matter of this disclosure is now described with reference to the following example, and it is appreciated that there are many variations which may be developed as a result of the teachings provided herein.

The eyeglass lenses have a front side 1 which is furthest from the wearer's face when worn, a back side 2 which is closest to the wearer's face when worn, and an outer perimeter or rim 3. Along this rim 3 is a groove or channel (the "lens rim groove" 4). This lens rim groove 4 is depicted in the drawings as square or rectangular in shape, but may be domed, triangular, or any geometry sufficient to secure a key or ring or bumper or carrier or interchanger 5 to the lens. It has been found that the key 5 is preferably bonded to the lens since a mechanical connection (e.g., friction fit) may be insufficient to provide the desired holding force of the ring to the lens. More specifically, a suitable bond is provided by a bonding material such as an epoxy between the groove 4 and the key 5 in the rim 3 of the lens. Preferably, the bonding material is tinted to have the same color as the key. In this manner, when cured, the groove 4 formed in the rim 3 of the lens is "masked" by the key 5, and the lens and the key look like one-piece. The bonding material is preferably inserted or applied in the groove 4, and the key 5 applied in a proper orientation in groove. As a part of this process of securing the key 5 to the lens groove 4, the key is heated to facilitate placement and bonding of the key to the lens.

It is also contemplated that the key 5 may not be initially formed as a second piece that is subsequently bonded to the lens, but instead the key is formed through a cutting process. For example, suitable cutting machinery would no longer form a groove 4 in the lens rim 3 but instead an integrated key 5 would be formed or cut in place in the lens rim and become a portion of the lens. As is the case when the bonding material is tinted in the above-described manner and that results in masking the lens groove 4 and a joined key 5 that becomes a single, integrated one-piece structure with the lens, the integrated key of this alternative forming process has no transitional line or demarcation between that portion of the lens that defines the key and the remainder of the lens.

Figure 9:
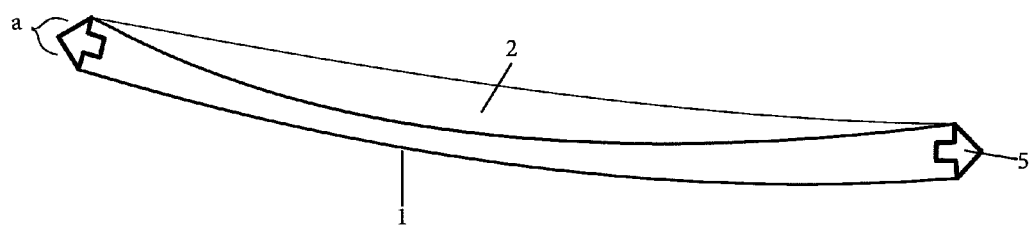
FIG. 9 is a cross-sectional view from above a lens with key attached.
Figure 10:
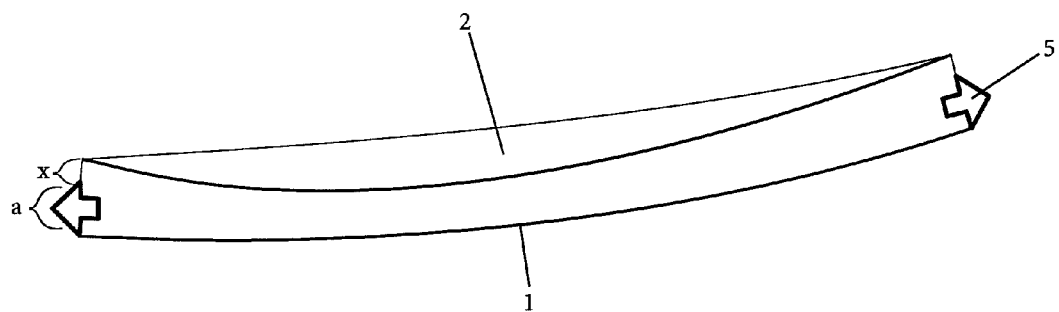
FIG. 10 is a cross-sectional view from above a lens with key attached.
Figure 11:
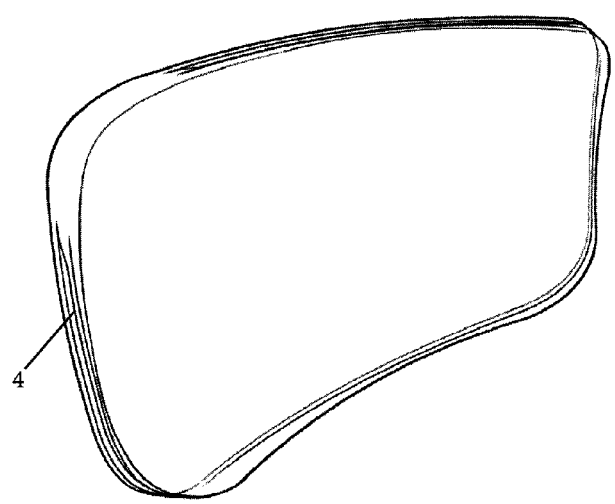
FIG. 11 is a perspective view of a lens with no key attached, revealing the lens rim groove.
Figure 12:
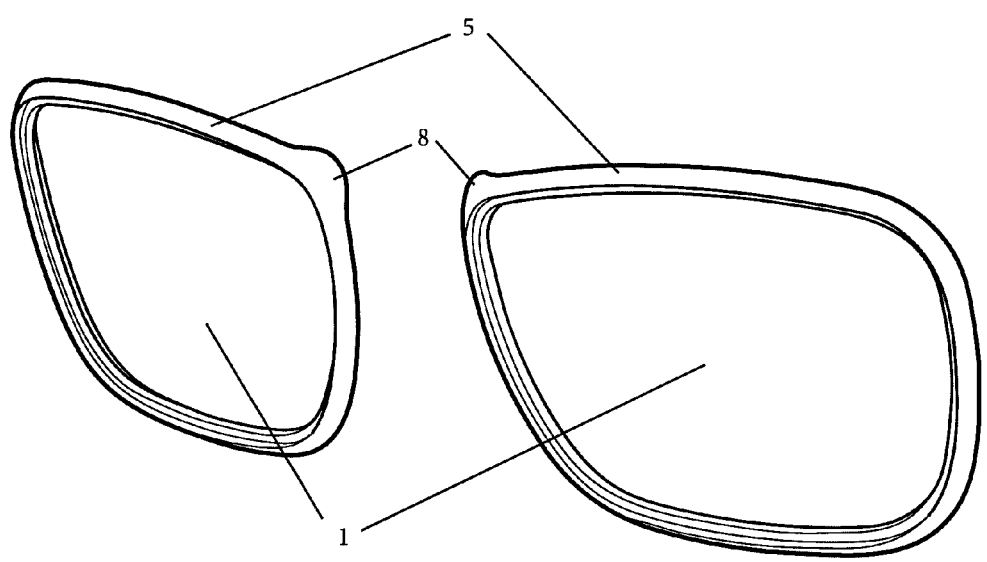
FIG. 12 is a perspective view of the front side of lenses with keys attached and tabs protruding from the keys.
Figure 13:
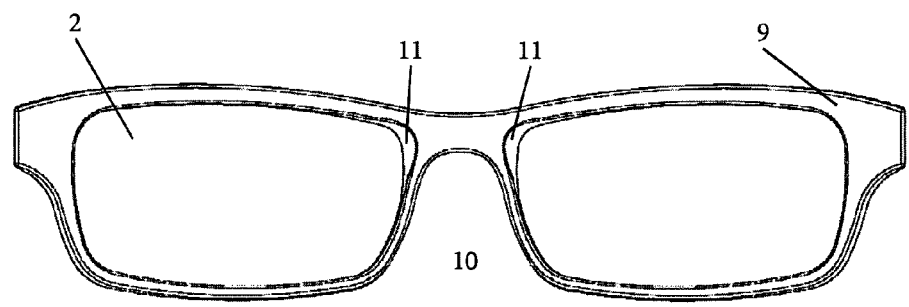
FIG. 13 is a view showing the back side of the frame with the lenses removed, and also the temples are removed (the temples extending from the hinge along the sides of the face and over the ears to hold the frame in place).
Figure 14:
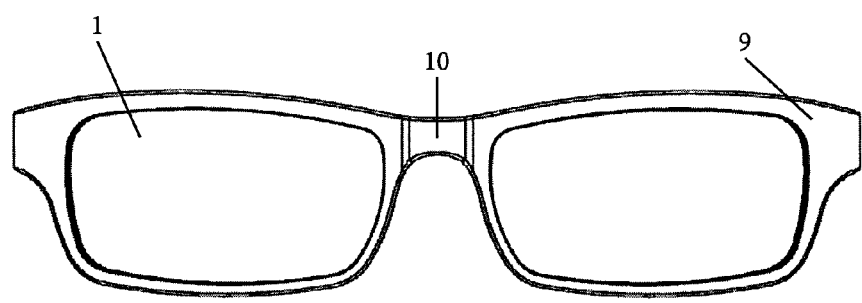
FIG. 14 is a view showing the front side of the frame of FIG. 13 with the lenses removed.
Figure 15:
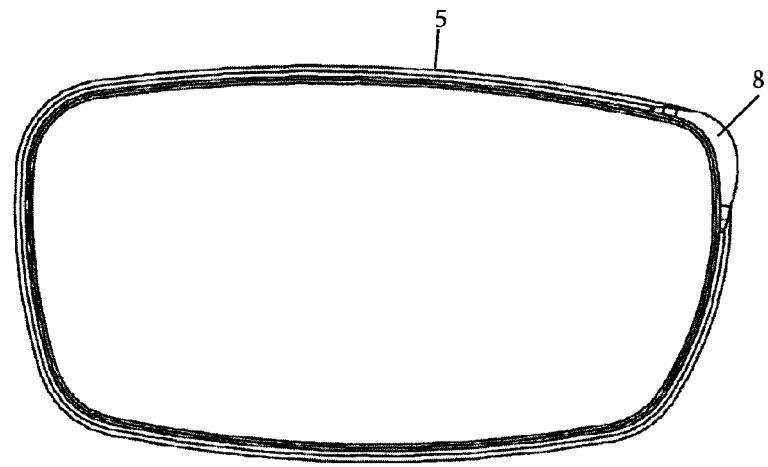
FIG. 15 is a view showing the back side of the left lens with the tab shown in the upper right-hand region.
Figure 16:
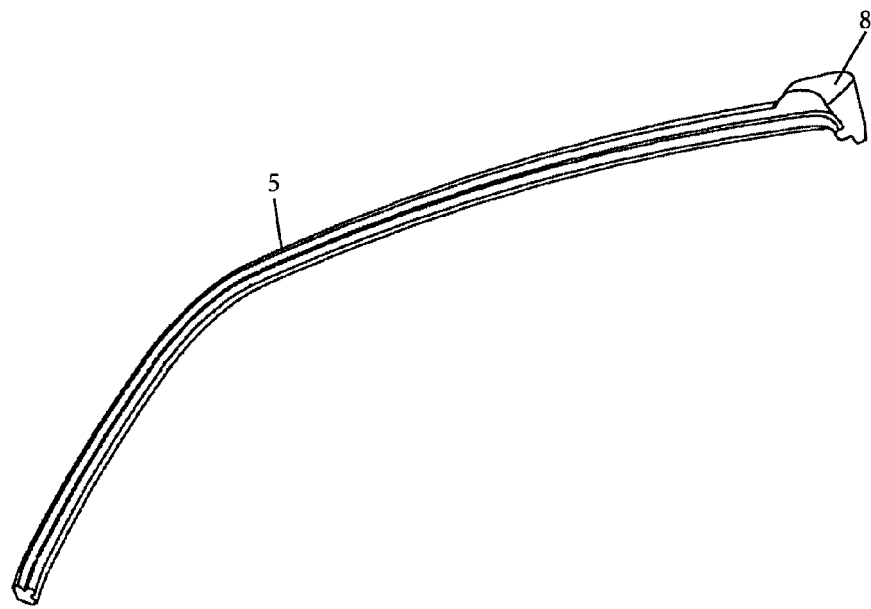
FIG. 16 is an enlarged perspective view of a portion of the key received around the perimeter of the lens (not shown) and a cross-section through the tab.
Figure 17:
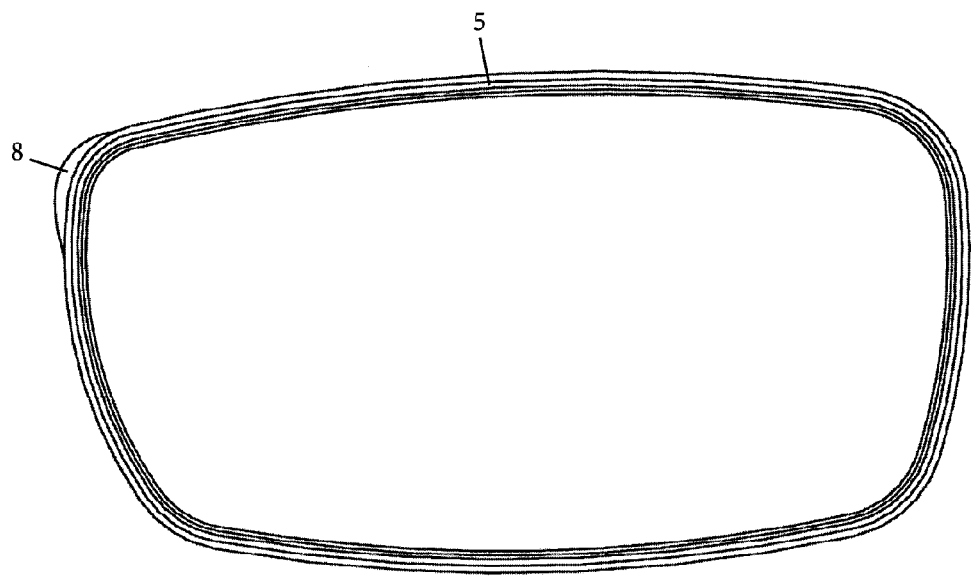
FIG. 17 is a view showing the front side of the left lens with the tab shown in the upper left-hand region.
Figure 18:
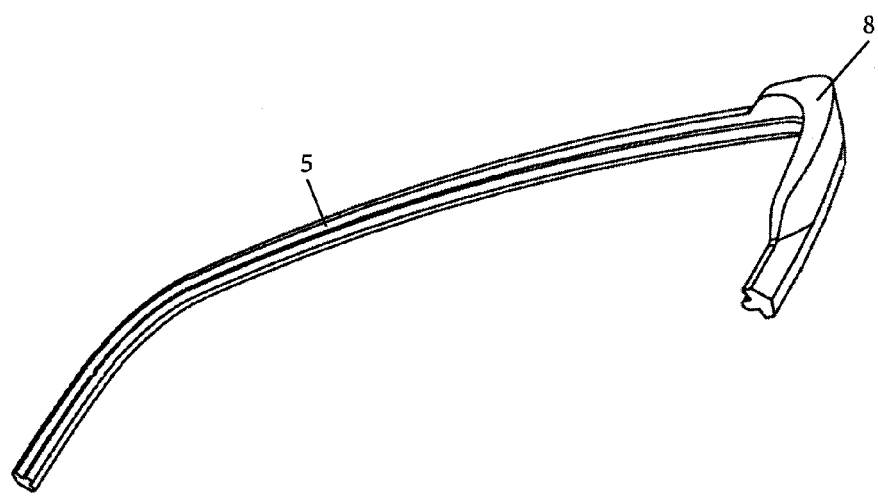
FIG. 18 is similar to FIG. 16 with a cross-section through the key adjacent the tab and further illustrates the details of the key.
Figure 19:
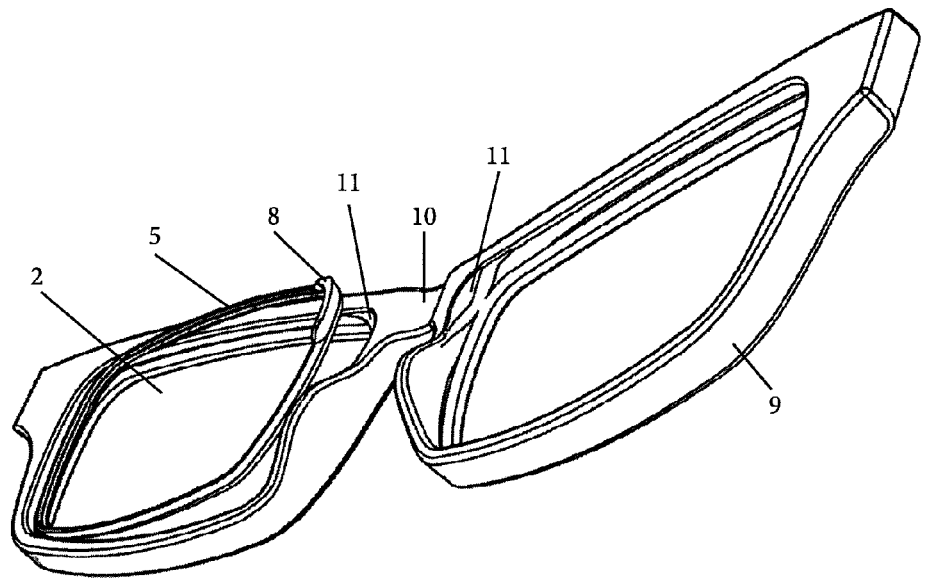
FIG. 19 is a perspective view of the back side of the frame with the left lens and key being inserted into the left lens opening.
Figure 20:
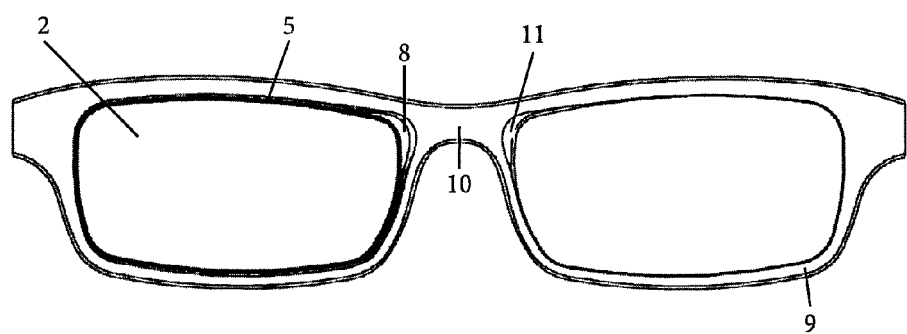
FIG. 20 is a view of the back side of the frame with the left lens in place.
Figure 21:
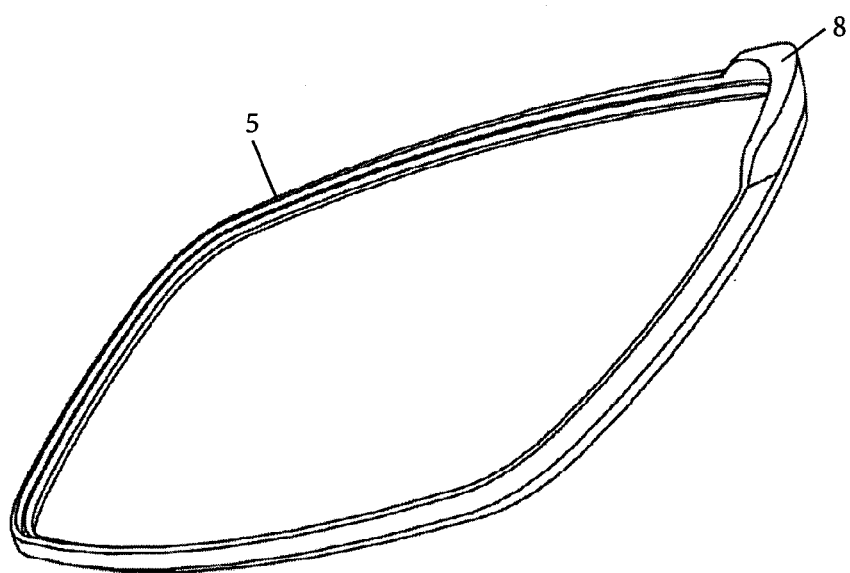
FIG. 21 is a perspective view of the key (with tab) on the left lens.

The distance from the lens rim groove 4 to the back side 2 of the lens may change as the thickness of the lens changes, but the distance from the lens rim groove 4 to the front side of the lens 1 remains the same, but one skilled in art will recognize that this need not be the case. FIGS. 9 and 10 show lenses of different thickness with uniform key 5 sizes and configurations. In FIGS. 9 and 10, "a" is used to show a thickness which is approximately equal to the thickness of the key. "x" is used to denote a variable thickness which is greater than "a."

Attached to each lens rim 3 is the key or bumper 5 fabricated from at least one of an epoxy, polymer, composite, metal, or other material, which fits between the lens rims 3 and frame 9 when the lenses are docked in the frame 9. The key 5 is of a generally uniform shape in a preferred arrangement for ease of manufacture and does not depend upon the thickness of the lens, so as to facilitate the interchangeability of lenses and frames. The key 5 material may be injected into a mold around the lens, or it may be pre-fabricated and attached to each lens or integrally formed on the lens rim 3 as described above.

This key 5 has an inner perimeter 6 which is configured to fit securely within the lens rim groove 4. The inner perimeter of the key 6 is depicted in the drawings as having a rectangular configuration, but one skilled in the art will recognize that the key may adopt other shapes or configurations, e.g., the key may be domed, triangular, or any geometry, so long as the lens rim groove 4 and the inner perimeter of the key 6 are configured to secure the key 5 to the lens. It will also be appreciated that the configuration of the key 5 may be formed at a slightly more acute angle than the corresponding groove 4 in the frame 9 without departing from the scope and intent of the present disclosure.

The key 5 also has an outer perimeter 7 which protrudes outwardly from the lens rim 3 and lens rim groove 4. This portion of the key 5 abuts the lens rim 3 and is chamfered, depicted in the drawings as having a triangular configuration. A domed, rectangular or any other geometric configuration may be used so long as the outer perimeter of the key 7 and the frame groove 12 are configured to secure each lens with attached key 5 to the frame 9.

The key 5 preferably also has a tab 8 formation, depicted in the drawings at the corner of the key 5 which is nearest the bridge portion of the frame 10 when the lens with key 5 is docked in a frame 9. While the outer perimeter of the key 7 is chamfered, the tab 8 of the outer perimeter of the key 7 is preferably not chamfered, but rather protrudes from the rest of the outer perimeter of the key. When the key 5 is attached to a lens and docked in a frame 9, the tab 8 is visible along the frame-lens interface and is particularly evident. While the drawings show the tab 8 at the corner of the key 5 nearest the bridge portion of the frame 10, the tab may be located at any point along the key.

The frame 9 features a groove along the inner surface of the frame (the "frame groove" 12), at the frame-lens interface. The shape and depth of the frame groove 12 is such that the outer perimeter of the key 5 fits in a complementary manner within the frame groove 12. The frame groove 12 is typically the same depth around the entire perimeter of the lens opening (just as the key 5 extends around the entire perimeter of the lens). When a lens with a key 5 is docked in the frame 9, the outer perimeter of the key 5 fits into the frame groove 12 when a sufficient amount of force is applied. The frame 9 is preferably notched, cut-out, or relieved at the bridge portion 10 of the frame-lens interface (or any other point where the tab 8 may be located) to receive the tab 8 configuration, and preferably the notch allows the tab to be received in a flush manner with the inner surface of the frame, i.e., the tab is fully received in the notch. The tab 8 rests in this notched portion of the frame 11 and the outward protrusion of the tab along the rear face of the frame also prevents the lens from being pushed from the rear side of the frame entirely through to the front side of the frame. Stated another way, frame groove 12 has first and second sidewalls that receive and engage respective surfaces of the key 5 along opposite faces thereof except that the frame groove is devoid of or has a reduced height inner sidewall in the notched portion of the bridge portion of the frame that receives the tab 8. In this manner, the key 5 does not have to snap over the frame 9 in the notched portion as the key is required to do i.e., snap over the sidewall of the frame groove that extends along the back side of the frame, around the remainder of the perimeter of frame 9. As a result, the key 5 is more easily inserted and removed relative to the frame openings in these notched portions of the frame groove. Less force is required to insert the individual lenses in these notched regions than when compared with the insertion/removal force required with the remainder of the perimeter of the lens and frame. Thus, the tab 8 on each lens 1 and the corresponding notched portion in each lens opening of the frame groove 12 provide a preselected region of decreased force required to insert and remove the lenses.

In an alternative configuration, the frame may have a protruding flange instead of the frame groove 12 while the outer perimeter of the key 5 has a groove configured to receive and correspond with the shape of the protruding flange of the frame. Likewise, the lens rim may have a protruding flange instead of the lens rim groove 4 while the inner perimeter of the key 6 has a groove configured to receive and correspond with the shape of the protruding flange of the lens. These configurations may be substituted for those described in the preceding paragraphs, resulting in the following combinations: (a) grooved lens rim, protruding flange on inner perimeter of key; grooved frame, protruding flange on outer perimeter of bumper, (b) grooved lens rim, protruding flange on inner perimeter of key; protruding flange on frame, grooved outer perimeter of key, (c) protruding flange on lens rim, grooved inner perimeter of key; grooved frame, protruding flange on outer perimeter of key (d) protruding flange on lens rim, grooved inner perimeter of key; protruding flange on frame, grooved outer perimeter of key.

Lenses with attached keys 5 may be docked in a frame 9 by applying a force to the back side of the lens 2 and pressing the lens into the back side of the frame 9. Lenses may be removed by applying a force to the front side of the lens 1. Docking the lenses in this way conceals the tab 8 so the tab is not visible from the front side of the eyeglasses. Alternatively, the frame 9 and lenses may be configured so that the lenses are docked by applying a force to the front side of the lens 1 and pressing the lens into the frame, and the lenses may be removed by applying a force to the back side of the lens 2.

In summary, the resulting lens has one portion that is used for optics and a second part of the lens (i.e., the key) is used to mechanically mount the lens to the frame. Moreover, by providing a tab on the key in a minor region of the lens, that is along a portion of the lens rim, and the associated notched portion on the frame, the forces applied to the lens in an effort to either remove the lens from the frame (or insert the lens into the frame) will be dispersed over a greater surface area, thus resulting in the tab requiring less force to be mounted to or removed from the lens.

A first item of the present disclosure is an eyeglass assembly that includes a frame having first and second lens openings formed therein, the frame including one of a groove and a protrusion around the lens openings. At least one lens is dimensioned for operative association with at least one of the first and second lens openings, the lens including one of a groove and a protrusion. A key selectively interconnects the lens to the at least one of the first and second openings in the frame, the key including (i) an other of a protrusion and a groove along an inner perimeter that mates with the one of the groove and protrusion of the lens, and (ii) an other of a protrusion and a groove along an outer perimeter that mates with the one of the groove and protrusion of the frame.

A second item is that the key has a fixed thickness and may be used with the first item.

A third item is that the key is fabricated from at least one of an epoxy, polymer, composite, or metal material, and the third item may be used with either or both of the first and second items.

A fourth item is that the key has an inner perimeter configured for receipt in a similarly configured lens groove, and the fourth item may be used in combination with any one or more of the first through third items.

A fifth item is that the key extends around the entire perimeter of the lens, and the fifth item may be used in combination with any one or more of the first through fourth items.

A sixth item is that the inner perimeter of the key has a cross-sectional configuration and dimension that is one of domed or triangular for receipt in the complementary-shaped lens groove, and the sixth item may be used in combination with any one or more of the first through fifth items.

A seventh item is that the key has an outer perimeter configured for receipt in a frame groove around the lens opening, and the seventh item may be used in combination with any one or more of the first through sixth items.

An eighth item is that the key extends around the entire perimeter of the frame, and the eighth item may be used in combination with any one or more of the first through seventh items.

A ninth item is that the outer perimeter of the key has a cross-sectional configuration and dimension that is one of domed or triangular for receipt in the complementary-shaped lens groove, and the ninth item may be used in combination with any one or more of the first through eighth items.

A tenth item is that the key has a tab protruding outwardly from a remainder of the bumper, and the tenth item may be used in combination with any one or more of the first through ninth items.

An eleventh item is that the frame includes a notched portion configured to receive the key tab, and the eleventh item may be used in combination with any one or more of the first through tenth items.

A twelfth item is that the notched portion of the frame is located adjacent a nose bridge portion thereof, and the twelfth item may be used in combination with any one or more of the first through eleventh items.

A thirteenth item is that the notched portion of the frame is located on an inner surface thereof whereby the key tab is not visible along an external surface of the frame when the eyeglass assembly is worn by an associated user, and the thirteenth item may be used in combination with any one or more of the first through twelfth items.

A fourteenth item is that the tab is provided over only a minor portion of the key, and the fourteenth item may be used in combination with any one or more of the first through thirteenth items.

A fifteenth item is a method of forming an eyeglass assembly having removable lenses that includes providing at least one removable eyeglass lens, providing a frame having at least one lens opening, forming a key to a rim of each eyeglass lens, providing a tab along a portion of the key that cooperates with a notched region in the frame, and inserting the lens into the frame, with less force required along the tab and notched region than a remainder of the eyeglass assembly.

A sixteenth item includes forming a groove along a lens rim that receives a portion of the key, and the sixteenth item may be used in combination with the fifteenth item.

A seventeenth item includes forming a groove within the frame that receives a portion of the key, and the seventeenth item may be used in combination with either or both of the fifteenth and sixteenth items.

An eighteenth item includes positioning the notched region of the frame groove in the bridge piece of the frame, and the eighteenth item may be used in combination with any one or more of the fifteenth through seventeenth items.

A nineteenth item includes positioning the tab where the lens adjoins the bridge piece of the frame, and the nineteenth item may be used in combination with any one or more of the fifteenth through eighteenth items.

This written description uses examples to describe the disclosure, including the best mode, and also to enable any person skilled in the art to make and use the disclosure. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Moreover, this disclosure is intended to seek protection for a combination of components and/or steps and a combination of claims as originally presented for examination, as well as seek potential protection for other combinations of components and/or steps and combinations of claims during prosecution.

The invention claimed is:

1. An eyeglass assembly comprising:
a frame having first and second lens openings formed therein, the frame including one of a groove and a protrusion around the lens openings;
at least one lens dimensioned for operative association with at least one of the first and second lens openings, the lens including one of a groove and a protrusion; and
a key selectively interconnecting the lens to the at least one of the first and second openings in the frame, the key including (i) an other of a protrusion and a groove along an inner perimeter that mates with the one of the groove and protrusion of the lens, and (ii) an other of a protrusion and a groove along an outer perimeter that mates with the one of the groove and protrusion of the frame, wherein the key has a tab protruding outwardly from a remainder of the key.

2. The eyeglass assembly of claim 1 wherein the key has a fixed thickness.

3. The eyeglass assembly of claim 2 wherein the key is fabricated from at least one of an epoxy, polymer, composite, or metal material.

4. The eyeglass assembly of claim 1 wherein the key has an inner perimeter configured for receipt in a similarly configured lens groove.

5. The eyeglass assembly of claim 4 wherein the key extends around the entire perimeter of the lens.

6. The eyeglass assembly of claim 1 wherein the inner perimeter of the key has a cross-sectional configuration and dimension that is one of domed or triangular for receipt in the complementary-shaped lens groove.

7. The eyeglass assembly of claim 1 wherein the key has an outer perimeter configured for receipt in a frame groove around the lens opening.

8. The eyeglass assembly of claim 7 wherein the key extends around the entire perimeter of the frame.

9. The eyeglass assembly of claim 1 wherein the outer perimeter of the key has a cross-sectional configuration and dimension that is one of domed or triangular for receipt in the complementary-shaped lens groove.

10. The eyeglass assembly of claim 1 wherein the frame includes a notched portion configured to receive the key tab.

11. The eyeglass assembly of claim 10 wherein the notched portion of the frame is located adjacent a nose bridge portion thereof.

12. The eyeglass assembly of claim 11 wherein the notched portion of the frame is located on an inner surface thereof whereby the key tab is not visible along an external surface of the frame when the eyeglass assembly is worn by an associated user.

13. The eyeglass assembly of claim 1 wherein the tab is provided over only a minor portion of the key.

14. A method of forming an eyeglass assembly having removable lenses comprising:
providing at least one removable eyeglass lens;
providing a frame having at least one lens opening;
forming a key to a rim of each eyeglass lens;
providing a tab along a portion of the key that cooperates with a notched region in the frame; and
inserting the lens into the frame, with less force required along the tab and notched region than a remainder of the eyeglass assembly.

15. The method of claim 14 further comprising forming a groove along a lens rim that receives a portion of the key.

16. The method of claim 14 further comprising forming a groove within the frame that receives a portion of the key.

17. The method of claim 16 further including positioning the notched region of the frame groove in the bridge piece of the frame.

18. The method of claim 14 including positioning the tab where the lens adjoins the bridge piece of the frame.

* * * * *